Nov. 3, 1931.  F. N. WOODMAN  1,829,773
CONVEYER BELT
Filed May 15, 1930
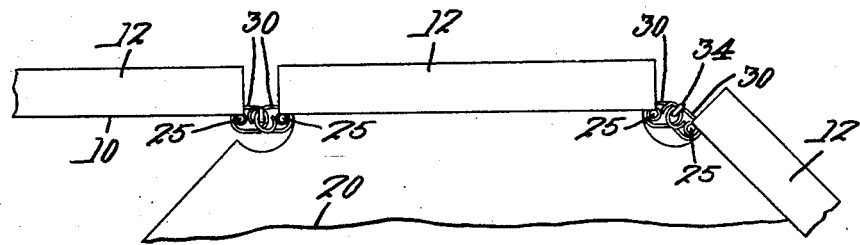
Fig. 1.
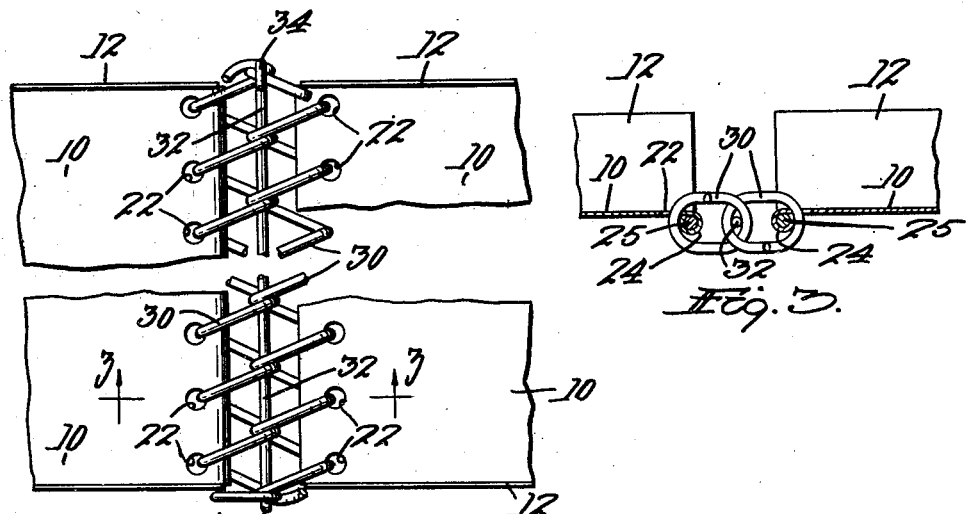
Fig. 2.
Fig. 3.
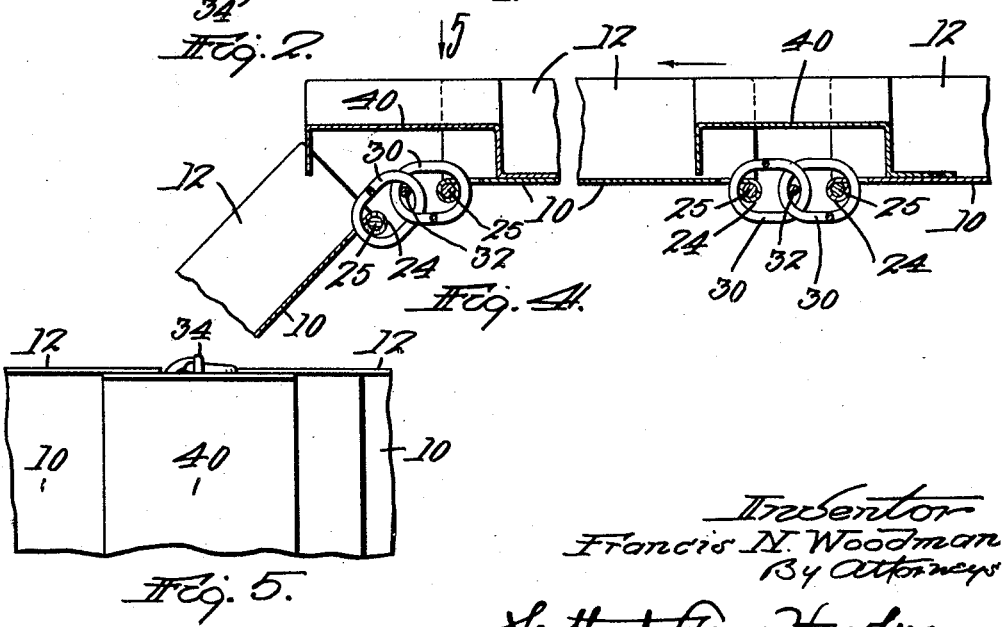
Fig. 4.
Fig. 5.
Inventor
Francis N. Woodman
By Attorneys
Southgate Fay & Hawley Patented Nov. 3, 1931

1,829,773

UNITED STATES PATENT OFFICE

FRANCIS N. WOODMAN, OF CLINTON, MASSACHUSETTS

CONVEYER BELT

Application filed May 15, 1930. Serial No. 452,794.

This invention relates to a belt for transporting loose material and is particularly designed for use in heat-treatment operations.

It is the general object of my invention to provide an improved conveyer belt formed in part of sheet metal plates and so constructed that permanent flexibility at the joints is assured.

A further object is to provide a belt which is particularly adapted to the transportation of small parts or fine or granular material.

A particular feature of the invention relates to the provision of an improved type of hinge joint between the sheet metal plates of the chain.

My invention further relates to arrangements and combinations of parts which will be hereinafter described and more particularly pointed out in the appended claims.

A preferred form of the invention is shown in the drawings, in which

Fig. 1 is a side elevation of a portion of my improved chain;

Fig. 2 is a partial plan view thereof;

Fig. 3 is a detail sectional view, taken along the line 3—3 in Fig. 2;

Fig. 4 is a sectional elevation of a modification; and

Fig. 5 is a partial plan view, looking in the direction of the arrow 5 in Fig. 4.

Referring particularly to Figs. 1, 2 and 3, my improved conveyer belt comprises sheet metal plates 10 which may be formed with side flanges 12 to assist in retaining the material to be transported. For many purposes, however, the belt is satisfactory with the flanges 12 omitted.

The belt is commonly mounted on driving pulleys or guide pulleys having the polyangular construction indicated at 20 in Fig. 1, the length of each face of the pulley being equal to the distance between joints of the belt.

Each sheet metal plate 10 is provided with a series of perforations 22 adjacent its end edges. Preferably, projecting end portions 24 (Fig. 3) outside of the perforations 22 are rolled up around cross-pins 25 to provide strong reenforcements at the ends of the plates.

Spiral wire members 30 are provided, the pitch of which corresponds to the spacing of the perforations 22. In the drawings I have shown two of these members 30 interlaced together and also laced through the perforations 22. I have also shown a reenforcing cross-pin 32 inserted in and between the coils of the spiral members 30. The ends of the members 30 may be bent over, as indicated in Fig. 2, to prevent displacement of the spiral members and the cross-pin 32 may be similarly bent over to prevent displacement, as indicated at 34.

In assembling my improved belt, the spiral members are preferably inserted and interlaced while in the form of circular coils, as they are more easily manipulated when in this shape. After the coils are inserted, the belt is preferably subjected to test under heat, which operation will elongate the coils as indicated in Fig. 3, after which the cross-pins 32 are inserted.

It has been found that the spiral members 30 provide an excellent hinge joint between the plates 10 and that this hinge joint is permanently flexible, even when the belt is operated continuously under high temperature conditions. The cross-pins 32, while not absolutely necessary, are very desirable, as they prevent the bottoming of the adjacent coils on each other and also reduce any tendency of the coils to contract transversely of the belt under tension. The reenforced ends of the plates 10 prevent the coils 30 from tearing out of the perforations 22.

The spiral hinge members prevent any possibility of the belt "freezing" or refusing to bend at the joints, as has been experienced with certain previous types of joints.

If the belt is to be used for transporting small parts or fine material which might sift between the ends of the plates 10, I provide cover plates 40 (Figs. 4 and 5) which may be welded or otherwise secured to the outer face of each member 10 near the leading end thereof. The cover plates extend over the joints and into close engagement with the next preceding plates, as indicated at the right in Fig. 4.

When the belt turns an angle, as indicated at the left in Fig. 4, the cover plate 40 continues to protect the joint, while the preceding plate 10 swings downward away from the plate 40, thus discharging any material lodged under the plate 40.

It will be understood that the side flanges 12 and the cover plates 40, as well as the reenforcing rods 32, may all be omitted under certain conditions of operation and whenever their use is not considered necessary. Furthermore, while I have shown only two spiral members 30 forming each flexible joint, it will be understood that the number of such spiral members may be increased if found desirable.

Having thus described my invention and the advantages thereof, I do not wish to be limited to the details herein disclosed, otherwise than as set forth in the claims, but what I claim is:—

1. A conveyer belt formed of sheet metal plates perforated adjacent their end edges, and a plurality of spiral wire members interlaced through said perforations and interlaced with each other, whereby said plates are flexibly connected, the end portions of said plates outside of said perforations being rolled about reenforcing rods to strengthen the end edges and resist the pull of the spiral wire members.

2. A conveyer belt formed of sheet metal plates perforated adjacent their end edges, a pair of spiral wire coils, one of said coils being threaded in the perforations of each plate and said coils overlapping along their adjacent side portions, and a cross rod extending through the overlapping side portions of both wire coils and positioned between said overlapping portions, and said coils and rod forming a permanently flexible connection between said sheet metal plates.

In testimony whereof I have hereunto affixed my signature.

FRANCIS N. WOODMAN.